United States Patent Office 3,370,867
Patented Feb. 27, 1968

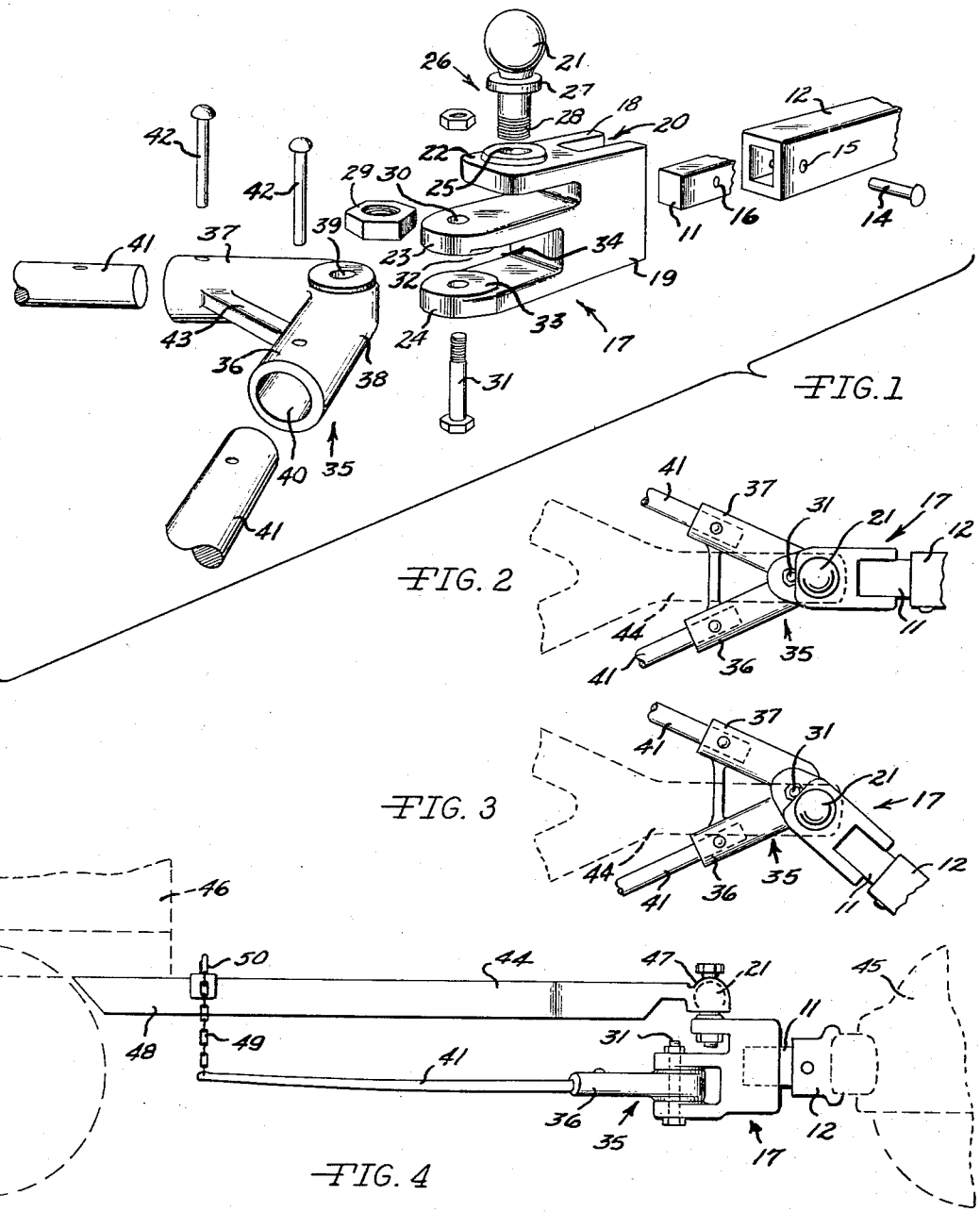

3,370,867
STRESSED SUPPORT STRUCTURES FOR
TRAILER HITCHES
Richard J. Berlincourt, Jonesville, Mich., and James E.
Berlincourt, 624 Chatham Circle, Jonesville, Mich.
49250; said Richard J. Berlincourt assignor to said
James E. Berlincourt
Filed June 2, 1966, Ser. No. 554,741
2 Claims. (Cl. 280—406)

ABSTRACT OF THE DISCLOSURE

A stress support structure for trailers and the like comprising a base element adjustably attachable to a prime mover such as an automobile and including an upstanding ball mount, the axis of the mount paralleling an offset lower and rearwardly provided vertical pivot. The pivot carries a tubular yoke element between rearward projections of the base element and stress bars are socketed in the yoke projecting rearwardly and the bars are secured at their outboard ends to elements of the trailer frame in selected strain relation, the strains being absorbed by the base element at the pivot and in which the offset accomplishes stabilization of the load and assures accurate tracking of the trailer in relation to the prime mover or automobile and in elimination of sag at the hitch.

The present invention is directed to a new and useful stressed support structure for trailer hitches and refers more particularly to hitches as between automobiles and the so-called travel trailers. Stressed supports in trailer hitches are well known in the prior art but in each of such structures moments of uncertainty occur during acceleration, deceleration, turning and shock wind loading. While intended to apply a constant stress the prior art devices result in noise and creaking at certain positions. Some structures, using cam surfaces in the stress bar support elements, are believed to introduce mechanical friction and mechanical shock at transition points where one stress bar is loading and the other is unloading. Such devices as known to applicant in the prior art are represented in the United States Letters Patents 2,679,404 to Thompson; 2,793,879 to Bair; 2,729,467, 3,185,499 and 3,194,584 to Reese; 3,151,879 to Bock and 2,898,124 to Bernard.

The support structure of the present invention differs from the above art by providing a much simpler structure and an in-line offset of the single pivot rearwardly of the axis of the ball hitch to establish a new and better eccentric relation during turning or shock conditions between stressed suspension and hitch connection.

The result in performance of this improvement is increased economy in the structure and superior safety reflected in roadability and stability. Tested under variant road and highway conditions the structure of the present invention resulted in no jerking, level ride, and superior resistance to violent wind loading and excellent distribution of stresses in tight turns. The degree of eccentric application of stressing during turning, climbing, and shock loading resulted in a tight connection at all times and the tracking qualities of the trailer seemed vastly improved. Sway of the trailer was substantially eliminated thus stabilizing the relation between towing vehicle and towed unit.

Accordingly, the principal object of the present invention is to provide a simplified stressed support structure for trailer hitches.

Another object is to provide a stepped frame or hitch mount and a separate yoke including stress bar sockets which is separately pivotal on the frame on a vertical axis paralleling and rearward of the ball mount axis. By "rearward" reference herein is made to the trailer side of the hitch structure. By "forward" herein, reference is made to the prime mover or automobile side of the hitch structure. "Upper" has reference to the hitch ball side of the frame structure and "lower" as used herein has reference to the underside of the hitch structure toward the road surface as the hitch structure is placed in use.

Still another object is to provide a hitch which is easily dismantled and stored and that provides excellent bias to stabilize the towed vehicle or trailer and to urge it toward parallelity with the tracking or towing vehicle.

General description

In general the stressed support structure for trailer hitches has application in the connection of a trailer or wheeled carriage to an automobile or other automotive primer mover. The support structure thus includes a tow bar attachable to the frame of the vehicle or prime mover on one side and includes attachment provisions for the tongue of the trailer and offset in-line pivotal attachment for stress bars on the other side. The stress bars are socketed in a yoke piece so that the stress bars extend rearwardly from the yoke and generally paralleling and below the tongue-frame elements of the trailer. Hence the stress bars are extended from the yoke in a divergent manner. The yoke is pivotally supported so as to be journalled on a vertical pin parallel to and rearward of the axis of a ball hitch. Chains pre-stress the stress bars and suspend the otherwise free ends thereof to the trailer frame. The ball hitch element is positioned on an axis parallel to and offset from the pivot axis of the yoke and above the plane of the yoke and provides a male seat for the hemispheric tongue hitch connector.

The support frame of the hitch is provided with forwardly extending vertical flange pieces in spaced apart relation to accomplish adjustable connection to a tow bar of otherwise conventional construction. Three plateaus are formed and provide horizontal rearward extensions of the frame. The uppermost plateau is provided with a vertical opening therethrough defining the vertical axis for the ball hitch element. The two lower plateaus are in spaced vertical register with each other and each extend rearwardly from the hitch frame. An opening through both of the lower plateau extensions is provided and through this second opening a pin is extended which pin provides an axial vertical journal means for the yoke element. The yoke is thus inserted between the two plateau elements and rides on the pivot pin. The axis of the pivot pin is parallel to and rearward of the axis of the ball hitch member and is beneath the ball hitch.

Hence an eccentric relation is established by the offset between ball hitch and yoke pivot whenever the trailer tongue is not parallel to the tow bar and this eccentric relation is accented by any increase of angular variance causing loss of tracking or parallelism between towing vehicle and trailer towed. This introduces stresses urging return of in-line or parallel relation between stress bar elements and ball hitch connection and tow bar. Stress introduced upon suspension of the torsion bars causes a no-sag relation as between towing vehicle and trailer and inequalities of stress are transmitted to the hitch frame through the yoke to the pivot pin and these are absorbed and equalized as between towed and towing elements.

In the drawing:

FIGURE 1 is an exploded perspective view of the present invention indicating the extreme simplicity of the structure and the offset as between ball hitch axis and yoke axis.

FIGURE 2 is a partial top plan view of the structure seen in FIGURE 1 where the yoke is connected to the hitch frame and the tow bar is parallel to the tongue of the trailer (shown in superimposed phantom line) so that the stress bar elements are equally stressed.

FIGURE 3 is a partial top plan view of the structure seen in FIGURE 2 but now parallelism between tongue and tow bar is destroyed as in turning and the eccentric relationship between stressed yoke element and ball hitch is indicated.

FIGURE 4 is a partial side elevation view of the structure as seen in FIGURE 2 and indicating the tongue of the trailer secured to the ball hitch and the yoke supported by the hitch frame element at one end and stressed by the chain suspension from the trailer frame at the rearmost ends.

Specific description

By reference to the FIGURE 1, the construction of the stressed support structure of the present invention will best be understood. The tow bar 11 of the towing vehicle (not shown) is telescoped into and selectively removable from the tubular tow bar socket piece 12. The opening 13 in the tubular socket piece 12 is rectilinear in cross section and slidably mates with the cross section of the tow bar 11 so as to provide gripping resistance to torsional stressing. A lock pin 14 is selectively extended through the opening 15 in at least one side of the tubular socket piece 12 and passes through the transverse opening 16 in the tow bar 11 thereby positioning and locking the tow bar 11 against removal. This tow bar assembly is attached to the automotive frame in a manner having no relation to the present invention but arranged so that the tow bar is selectively extendable rearwardly of the towing vehicle and on a line running the length of the vehicle and centered between the rear wheels thereof.

A base casting or hitch frame 17 is provided having forwardly extending spaced apart parallel vertical flanges 18 and 19. These flanges 18 and 19 provide a vertical slot 20 between the flanges 18 and 19 of a width accommodating the snug insertion of the tow bar 11. The tow bar 11 is then welded or otherwise securely affixed to the flanges 18 and 19 at a selected elevation to match or level with the position of the hitch ball 21 so that the trailer frame (not shown) is in parallel relation to the normal relaxed frame line of the towing vehicle. The hitch frame 17 is of cast or forged steel and includes three separate rearwardly extending horizontal plateau or pedestal extensions 22, 23, and 24. The uppermost plateau 22 defines a vertical opening 25 therethrough. This opening 25 provides a support for the insertion of the ball hitch element 26. The flange 27 of the ball hitch element 26 fits flushly against the boss 28 surrounding the opening 25 and the threaded base 28 extends through the opening 25 and the hitch element 26 is secured in position by the hitch nut 29. Accordingly the hitch ball 21 projects vertically upward from the opening 25.

The plateau pieces 23 and 24 are in spaced apart register, one above the other. An opening 30 is provided which extends through both of the plateau elements 23 and 24. This second opening 30 accommodates a yoke pin 31 which establishes a vertical journal element or trunnion supported by the plateau elements 23 and 24. The opening 30 is parallel to and offset from the opening 25. The opening 30 is rearwardly of the opening 25 and below the opening 25. Hence axes of the yoke pin 31 and ball hitch element 26 are parallel to each other and in in-line relation to each other and on a plane longitudinally cutting through the frame 17 and on the axes of the openings 25 and 30.

A boss 32 and boss 33 are provided in face to face relation in the gap 34 between the plateau pieces 23 and 24. As will be seen these provide thrust surfaces or shoulders for the pivotal attachment of the yoke 35. The yoke 35 comprises a Y shaped structure having diverging socket arms 36 and 37 and a tang portion 38. An opening 39 is provided transversely through the tang portion 38, the axis of the opening 39 being normal to the plane of the arms 36 and 37 of the yoke 35. The thickness of the tank 38 is such as to provide a snug fit of the yoke 35 in the gap 34 between the bosses 32 and 33. The opening 39 is sized to provide a good journal relation against the vertical pivot pin 31. Hence upon assembly the yoke 35 is pivotal on the axis of the yoke pin 31 and stresses are transmitted to the plateaus 23 and 24 of the frame 17 as thrust against the bosses 32 and 33.

The divergent arms 36 and 37 are tubular to provide axial socket openings 40 into which stress or spring bars 41 are inserted. The stress or spring bars 41, once socketed, are secured in position by the lock pins 42 extending through the socket portion of the arms 36 and 37 and through registering locating openings in the bars 41. The yoke 35 is reinforced by the triangular web 43 since the stresses in the bars 41 are transmitted through the yoke 35 and to the frame 17. The springs or bars 41 are steel elements specially tempered to flex without permanent deformation and are provided with support chains (FIGURE 4) at their outermost extremities which pre-stress the bars 41 toward the trailer frame. The yoke 35 is preferably cast or forged steel. As will be appreciated from the FIGURE 1 the stressed support structure is easily assembled and disassembled for use and compact storage without complex tools or unusual skills.

By reference to FIGURE 2 the hitch tongue 44 of the towed structure such as a trailer is indicated in phantom line superimposed over the hitch frame 17 and is connected to the hitch ball 21 in a well known manner so as to allow a universal action at the connection to the hitch ball 21. This assures a towing connection between towing and towed structure, but standing alone the tongue 44 would throw the entire weight of the towed vehicle onto the hitch frame 17 with resultant sag or buckling of the hitch structure and would cause severe stressing of the frame of the prime mover or towing vehicle. The stress bars 41 counteract this tendency in a spring-like manner being supported at the hicth frame 17 by the yoke 35 and all stresses being transmitted to the yoke 35 at sockets 40 and thence to the hitch frame at the pivot pin 31 and thrust shoulders 32 and 33. In the FIGURE 2 the tongue 44 is in line with the pivot pin 31 and hitch ball 21 as when the towed vehicle and towing vehicle are aligned. Under this condition no eccentric forces act upon the structure though the stress bars 41 at their outermost ends are suspended by chains to the trailer frame as will be seen and under a pre-stress counteracting any tendency toward sag.

By reference to FIGURE 3 the eccentric relation arising as a consequence of a deviation from the in-line condition seen in FIGURE 2 is appreciated as during a relatively sharp turn. In FIGURE 2 the frame 17 establishes continuous alignment of the ball 21 and pin 31 but the tongue 44 remains on the ball 21 while the yoke 35 retains its pivotal connection on the pin 31. Hence the yoke 35 is displaced from its aligned position with the tongue 44 (as seen in FIGURE 3) causing a bias in the yoke 35 transmitted through the stress bars 41 to their suspended attachment points on the frame of the towed vehicle. These stresses are absorbed in the bars 41 and act upon the pivot pin 31 urging a bias to return to the position seen in FIGURE 2. A similar force is applied acting in a vertical plane when the towed vehicle is on a variant angle of grade than the towing vehicle. This force tends to stabilize any tendency in the trailer to sway and assures an acting bias of a magnitude proportional to the misalignment between towed and towing vehicles.

Preferably the offset between axis of the hitch ball 21 and the parallel axis of pin 31 is less than 2 inches and best performance occurs when the offset is between 1¾ inches and 1¼ inches.

In the FIGURE 4 the relation between towing vehicle 45 and towed vehicle 46 is best appreciated. The towing tongue 44 is extended from the frame of the vehicle or trailer 46 and this includes a ball socket 47 on its forward extension. The ball socket 47 provides a hemispheric seat which rests on the hitch ball 21 hence securing the hitch frame 17 in towing relation to the tongue 44. The hitch frame 17 is in turn secured to the towing vehicle such as the automobile 45. The yoke 35 is pivotally axised on the vertical pivot pin 31. Hence the yoke 35 is supported so that the divergent arms 36 and 37 extend in a generally horizontal direction and movable on the vertical axis of the pin 31. The spring or stress bars 41 are inserted in the sockets 40 provided in each of the arms 36 and 37. These bars 41 extend parallel to and beneath the hitch tongue 44 and the hitch tongue 44 also diverges to contact with the frame 48 of the trailer or towed vehicle 46. At selected points on the tongue 44 near the connection to the trailer frame 48 chains are provided to support the rearmost ends of the bars 41. Lever-like chain elevators 50 well known in the art are secured to the tongue 44 so as to apply leverage to the chain 49 and pre-stress the bars 41. This assembly is preferably accomplished when the towing vehicle is in alignment with the towed vehicle as seen in FIGURE 2. Equal pre-stressing of both bars 41 is then easiest accomplished.

The structure easily accommodates the application of Zerk type lube coupling (not shown) and good bearing tolerances are observed.

The structure thus described has undergone severe testing under adverse road conditions and with variances in load and drivers have expressed surprise at the resulting ease of handling and stability. Crosswind conditions, accentuated in the passage of trucks causing a dynamic wind screen and resultant wind shock, do not cause violent sway as in comparatively tested devices. Return to tracking is smooth with no attendant jerking, hitch creaking or noise. In use the device thus described has been extremely easy to assemble and disassemble for alternating use and storage. It is more economical and durable solving initial cost and subsequent maintenance problems.

Having thus described my invention and the preferred embodiment other improvements, modifications and changes will occur to those skilled in the art and such improvements, modifications and changes are intended to be included herein limited only by the scope of the hereinafter appended claims.

We claim:
1. A stressed support hitch structure for travel trailers and the like comprising:
   a frame element having a first opening therethrough and a second opening therethrough parallel to said first opening and offset rearwardly therefrom and including a pair of spaced apart mounting flanges extending therefrom;
   a yoke element journalled to pivot on the axis of said second opening through said frame and including divergent socket portions;
   a ball hitch secured to said frame through said first opening in said frame and spaced above and offset from said yoke element; lift means adapted to extend between the free end of each stress bar and the trailer to stress said bars; and
   stress bars removably socketed in said yoke members at one end.

2. A stressed support hitch structure for travel trailers and the like comprising:
   a frame having two spaced apart parallel flanges extending from an end thereof and having a ball hitch horizontal pedestal defining a vertical opening therethrough and a pair of spaced apart horizontal rearwardly facing supports, both of said supports having a vertical registering opening therethrough on a common axis, the axis of said opening being offset rearwardly from said opening through said ball hitch pedestal;
   a ball hitch element secured to said frame through said opening through said ball hitch pedestal and extending axially therefrom above said pedestal;
   a Y shaped yoke element, the divergent arms of which element are socketed and the extension element having an opening therethrough on an axis transverse to the plane of said arms;
   a pivot pin located in said vertical openings through said rearward facing supports of said frame and through the opening in said yoke; lift means adapted to extend between the free end of each stress bar and the trailer to stress said bars; and
   stress bars socketed in said dixergent arms of said yoke member and extending rearwardly and outwardly therefrom whereby stressing is transmitted to said frame on the rearmost vertical axial pivot offset from and below said ball hitch.

References Cited

UNITED STATES PATENTS

| 2,679,404 | 5/1954 | Thompson | 280—461 |
| 2,793,879 | 5/1957 | Bair | 280—406 |
| 2,863,673 | 12/1958 | Lisota | 280—406 |
| 2,952,475 | 9/1960 | Reese | 280—406 |

FOREIGN PATENTS 937,656  9/1963  Great Britain.

LEO FRIAGLIA, *Primary Examiner.*